US011536695B2

(12) United States Patent
Tanaka et al.

(10) Patent No.: US 11,536,695 B2
(45) Date of Patent: Dec. 27, 2022

(54) CONCENTRATION MEASURING INSTRUMENT

(71) Applicant: Tyco Electronics Japan G.K., Kawasaki (JP)

(72) Inventors: Tsuyoshi Tanaka, Kawasaki (JP); Heewon Jeong, Kawasaki (JP); Kazuo Hasegawa, Kawasaki (JP)

(73) Assignee: Tyco Electronics Japan G.K., Kawasaki (JP)

( * ) Notice: Subject to any disclaimer, the term of this patent is extended or adjusted under 35 U.S.C. 154(b) by 243 days.

(21) Appl. No.: 16/811,597

(22) Filed: Mar. 6, 2020

(65) Prior Publication Data
US 2020/0209194 A1 Jul. 2, 2020

Related U.S. Application Data

(63) Continuation of application No. PCT/IB2018/056810, filed on Sep. 6, 2018.

(30) Foreign Application Priority Data

Sep. 7, 2017 (JP) .............................. JP2017-171876

(51) Int. Cl.
| G01N 29/036 | (2006.01) |
| G01K 13/00 | (2021.01) |
| G01N 29/24 | (2006.01) |
| G01N 29/44 | (2006.01) |

(52) U.S. Cl.
CPC ........... *G01N 29/036* (2013.01); *G01K 13/00* (2013.01); *G01N 29/2437* (2013.01);
(Continued)

(58) Field of Classification Search
CPC ............. G01N 29/036; G01N 29/2437; G01N 29/4409; G01N 29/36; G01N 29/326;
(Continued)

(56) References Cited

U.S. PATENT DOCUMENTS 5,524,477 A * 6/1996 Wajid ................... G01N 29/036
73/24.01
5,886,262 A * 3/1999 Sinha ..................... G01H 13/00
73/579

FOREIGN PATENT DOCUMENTS

| JP | 53001596 A | 1/1978 |
| JP | 54080172 A | 1/1979 |

(Continued)

OTHER PUBLICATIONS

PCT Notification, The International Search Report and the Written Opinion of the International Searching Authority, International Application No. PCT/IB2018/056810, dated Dec. 7, 2018, 14 pages.

(Continued)

*Primary Examiner* — Tarun Sinha
(74) *Attorney, Agent, or Firm* — Barley Snyder

(57) ABSTRACT

A concentration measuring instrument includes a piezoelectric vibrator transmitting an ultrasonic wave into a solution contained in a cavity and detecting the ultrasonic wave reflected, a temperature sensor measuring a temperature of the solution, a drive circuit generating a drive signal driving the piezoelectric vibrator, a phase comparator performing a phase comparison between the drive signal and a detection signal, a frequency setting circuit making the drive circuit generate drive signals having sequentially different frequencies and monitoring a phase comparison result to detect a resonant frequency, and a Phase Locked Loop (PLL) circuit making a frequency of the drive signal follow the detected resonant frequency. A microcomputer determines a concentration of a solute in the solution on a basis of the frequency of the drive signal while the PLL circuit is being operated and a result of a temperature measurement by the temperature sensor.

25 Claims, 11 Drawing Sheets

(52) U.S. Cl.
CPC ... *G01N 29/4409* (2013.01); *G01N 2291/014* (2013.01); *G01N 2291/022* (2013.01); *G01N 2291/102* (2013.01)

(58) Field of Classification Search
CPC ............. G01N 29/42; G01N 2291/014; G01N 2291/022; G01N 2291/102
See application file for complete search history.

(56) References Cited

FOREIGN PATENT DOCUMENTS

| | | |
|---|---|---|
| JP | 58077656 A | 5/1983 |
| JP | H07311183 A | 11/1995 |
| JP | 8117687 A | 5/1996 |
| JP | H11118774 A | 4/1999 |
| JP | 2000084484 A | 3/2000 |
| JP | 2007010543 A | 1/2007 |
| JP | 201247593 A | 3/2012 |
| KR | 20080097011 A | 11/2008 |

OTHER PUBLICATIONS

Barwicz A et al: 11 Ca Libra Tion of an Electronic Measuring System for Ultrasonic Analysis of Solutions 11, IEEE Transactions on Instrumentation and Measurement, IEEE Service Center, Piscataway, NJ, vol. 39, No. 6., Dec. 1, 1990 (Dec. 1, 1990), pp. 1030-1033, XP000177465, ISSN: 0018-9456, DOI: 10.1109/19.65820, p. 1030.
Barwicz A et al: 11 Electronic Measuring System for Ultrasonic Analysis of Solutions II. IEEE Transactions on Instrumentation and Measurement, IEEE Service Center, Piscataway, NJ, vol. 39, No. I, Feb. 1, 1990 (Feb. 1, 1990), pp. 269-273, XP000101452, ISSN: 0018-9456, DOI: 10.1109/19.50463, p. 269-p. 270.
Abstract of JP2012047593, dated Mar. 8, 2012, 1 page.
Konno, T. "Kantanna chōonpakansyoukei no Shisaku, (Prototype of Simple Ultrasonic Interferometer)", Fukushima Daigaku Rika Houkoku (Science Reports of Fukushima University), No. 5, pp. 1-5.
Wada, Y., Shinbo, T. and Oda, M., "Chōonpakanshoukei ni yoru ekitai no onsokusokutei jou no ni, san no mondai (Couple of Problems in Sonic Speed Measurement of Liquid by Ultrasonic Interferometer)", OYO Butsuri, vol. 18, Nos. 10-12, pp. 351-352.
JPO Notice of Reasons for Refusal, dated May 17, 2021, 5 pages.
Barwicz, "Electronic Measuring System for Ultrasonic Analysis of Solutions", IEEE Transactions on Instrumentation and Measurement, IEEE, Feb. 1990, and vol. 39, No. 1, pp. 269-273.
Barwicz, "Calibration of an Electronic Measuring System for Ultrasonic Analysis of Solutions", IEEE Transactions on Instrumentation and Measurement, vol. 39, No. 6, Dec. 1990, vol. 39, No. 6, pp. 1030-1033.
Abstract of KR 20080097011, dated Nov. 4, 2008, 1 page.

\* cited by examiner

CONCENTRATION MEASURING INSTRUMENT

CROSS-REFERENCE TO RELATED APPLICATIONS

This application is a continuation of PCT International Application No. PCT/IB2018/056810, filed on Sep. 6, 2018, which claims priority under 35 U.S.C. § 119 to Japanese Patent Application No. 2017-171876, filed on Sep. 7, 2017.

FIELD OF THE INVENTION

The present invention relates to a concentration measuring instrument and, more particularly, to a concentration measuring instrument for measuring the concentration of a solute in a solution.

BACKGROUND

Conventionally, a urea SCR (Selective Catalytic Reduction) system is known as an exhaust gas purification system for an automobile. This urea SCR system is a system for reducing nitrogen oxides NOx in exhaust gas of a diesel engine by spraying an aqueous solution containing urea as a solute into the exhaust gas. An automobile adopting this urea SCR system is mounted with a tank containing an aqueous urea solution. The removal rate of NOx decreases if the concentration of urea in the aqueous solution in this tank is too low, whereas ammonia derived from the urea is directly discharged if the concentration is too high. Therefore, the concentration of urea in the aqueous solution in this tank is required to be constantly monitored and strictly managed while the automobile is running.

Conventionally, a sonic speed measurement approach is adopted as a measurement approach for the concentration of urea in the aqueous solution in this urea SCR system, as disclosed in Japanese Patent Application 2012-47593A. This sonic speed measurement approach is a measurement approach utilizing the fact that the speed of an ultrasonic wave varies with the concentration of a solute (urea) in an aqueous solution. In this sonic speed measurement approach, a piezoelectric vibrator and a reflector are so positioned as to face each other having the aqueous solution intervening therebetween. Then, the piezoelectric vibrator is driven to transmit an ultrasonic pulse into the aqueous solution, and a delayed time until the ultrasonic pulse transmitted is reflected back from the reflector is measured. By correcting the measured delayed time using the temperature of the aqueous solution, the concentration of urea can be detected.

However, in the case of this sonic speed measurement approach, there are the following problems:

1. Because it is necessary to secure the resolution of the delayed time measurement, the distance between the piezoelectric vibrator and the reflector cannot be shortened, and therefore it is difficult to downsize the urea SCR system.

2. The attenuation rate of an ultrasonic wave during travel in an aqueous solution varies depending on frequency. Therefore, if ultrasonic pulses in which ultrasonic waves having a plurality of frequencies are mixed together are transmitted, an ultrasonic pulse waveform is disturbed, which leads to an increase in measurement error of the delayed time. In order to prevent this, such a complicated circuit as to generate and transmit a sine wave pulse is required, which may lead to an increase in cost.

3. A switching circuit for separating the transmitted ultrasonic wave and the received ultrasonic wave is required. Therefore, the responsiveness may degrade.

In order to solve the problems of this sonic speed measurement approach, a cavity resonance method, which is a concentration measurement approach for a medium in a solution contained in a cavity, is disclosed in Konno, T. "Kantanna chōonpakansyoukei no Shisaku (Prototype of Simple Ultrasonic Interferometer)", Fukushima Daigaku Rika Houkoku (Science Reports of Fukushima University), No. 5, pp. 1-5, and in Wada, Y., Shinbo, T. and Oda, M. "Chōonpakanshoukei ni yoru ekitai no onsokusokutei jou no ni, san no mondai (Couple of Problems in Sonic Speed Measurement of Liquid by Ultrasonic Interferometer)", OYO BUTSURI, vol. 18, Nos. 10-12, pp. 351-352.

This cavity resonance method is a measurement approach utilizing the fact that the resonant frequency varies with the concentration of a solute. In this cavity resonance method, an ultrasonic wave as a continuous wave is transmitted into the cavity containing the solution. Then, one resonant mode of multiple resonant modes occurring in the cavity by this ultrasonic wave as a continuous wave is captured, and the resonant frequency of the one resonant mode is detected. Since this resonant frequency varies with the concentration of the solute, the concentration of the solute can be detected by correcting the detected resonant frequency using the temperature of the solution.

Research on this cavity resonance method has advanced in terms of its principle. Until now, however, the cavity resonance method has stagnated at a level where a measurement experiment is performed in a laboratory or the like by connecting a large-scale measuring instrument for successfully capturing a minute variation at a resonant point. That is, this cavity resonance method is a measurement approach not adopted as a measuring method for easily measuring the concentration of the solute in the solution. In other words, this cavity resonance method is a measurement approach not embodied in such a small size as to be adoptable for the urea SCR system mounted in the automobile and further not adopted as an automatic and continuous measuring method.

SUMMARY

A concentration measuring instrument includes a piezoelectric vibrator transmitting an ultrasonic wave into a solution contained in a cavity and detecting the ultrasonic wave reflected, a temperature sensor measuring a temperature of the solution, a drive circuit generating a drive signal driving the piezoelectric vibrator, a phase comparator performing a phase comparison between the drive signal and a detection signal, a frequency setting circuit making the drive circuit generate drive signals having sequentially different frequencies and monitoring a phase comparison result to detect a resonant frequency, and a Phase Locked Loop (PLL) circuit making a frequency of the drive signal follow the detected resonant frequency. A microcomputer determines a concentration of a solute in the solution on a basis of the frequency of the drive signal while the PLL circuit is being operated and a result of a temperature measurement by the temperature sensor.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
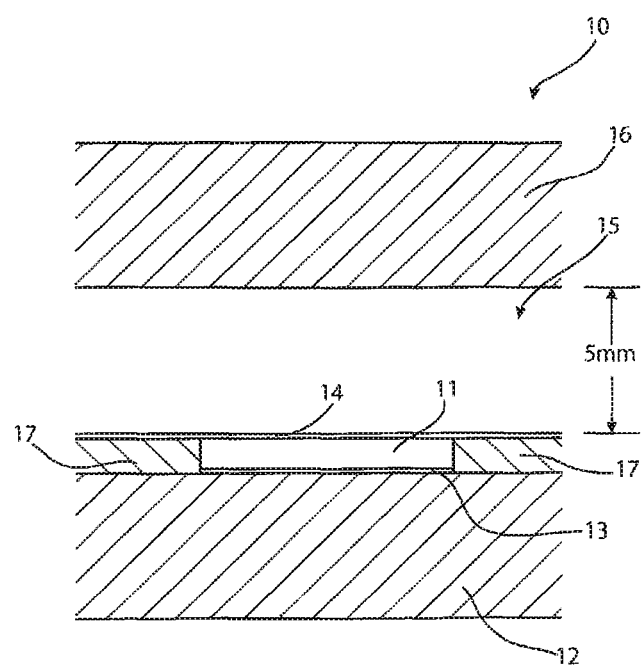
FIG. 1 is schematic sectional view of a cavity resonator according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A cavity resonator 10 according to an embodiment of the invention is shown in FIG. 1. The cavity resonator 10 has a piezoelectric vibrator 11. The piezoelectric vibrator 11 is fixed to a first stainless steel plate 12 having a resin tape 13 as a packing member intervening between the vibrator 11 and the first stainless steel plate 12. The piezoelectric vibrator 11 faces a cavity 15 having a resin tape 14 for impedance matching intervening between the vibrator 11 and the cavity 15. This cavity 15, in an exemplary embodiment, is 5 mm in width. The piezoelectric vibrator 11 faces a second stainless steel plate 16 across the cavity 15. The piezoelectric vibrator 11 is surrounded by a rubber member 17 such as elastomer.

When the cavity resonator 10 is used as a urea concentration sensor for an aqueous urea solution in the urea SCR system described above, the cavity 15 of this cavity resonator 10 is filled with an aqueous urea solution. In that case, the second stainless steel plate 16 can substitute a wall face of a tank containing the aqueous urea solution for the second stainless steel sheet 16. Moreover, elements of this cavity resonator 10 except the second stainless steel plate 16 are unitized, and fixed at a position across a 5-mm void from the wall face within the tank.

Herein, however, for the experimental convenience, not an aqueous urea solution but a sodium chloride solution is used.

Figure 2:
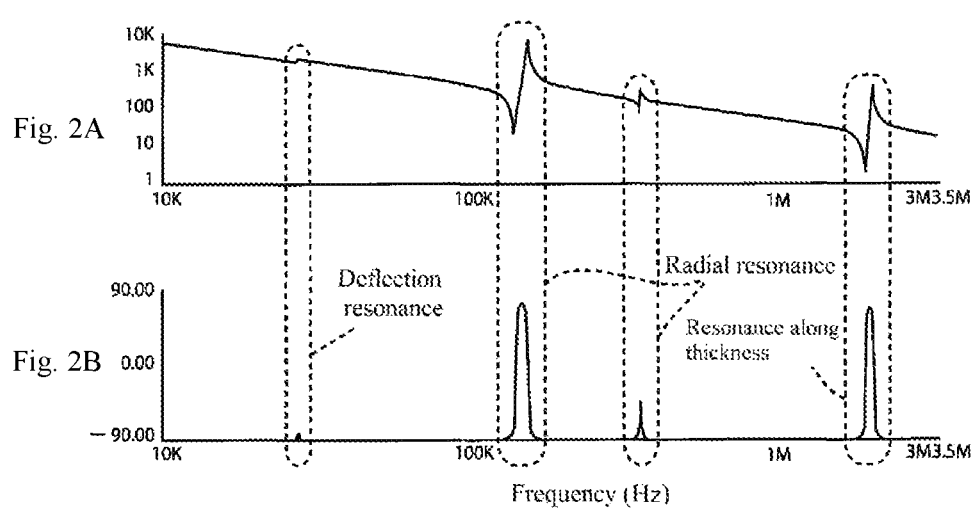
FIG. 2A is a chart of impedance vs. a frequency characteristic of a piezoelectric vibrator when a cavity of the cavity resonator is empty.
FIG. 2B is a chart of phase vs. the frequency characteristic of the piezoelectric vibrator when the cavity is empty.

FIGS. 2A and 2B are charts showing frequency characteristics of the piezoelectric vibrator 11 when the cavity 15 of the cavity resonator 10 shown in FIG. 1 is empty (air). In FIGS. 2A and 2B, the horizontal axes represent frequency (Hz), and the vertical axes represent impedance (A) and phase (B). The impedance is a value obtained by dividing a potential difference between both ends of the piezoelectric vibrator 11 by a current flowing in the piezoelectric vibrator 11. In addition, the phase is a phase of a current flowing in the piezoelectric vibrator 11 with respect to a voltage applied thereto. As shown in FIGS. 2A and 2B, even when the cavity 15 of the cavity resonator 10 shown in FIG. 1 is empty, a resonance due to the piezoelectric vibrator 11 itself occurs. The piezoelectric vibrator 11 transmits an ultrasonic wave into a solution in the cavity 15 and detects the ultrasonic wave reflected.

Figure 3:
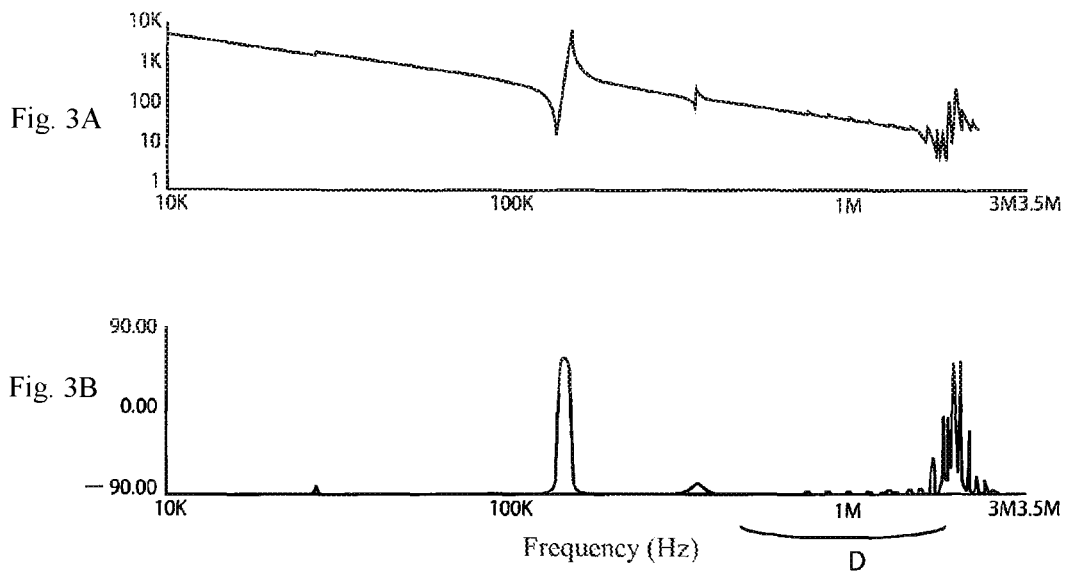
FIG. 3A is a chart of impedance vs. the frequency characteristic when the cavity is filled with a sodium chloride solution.
FIG. 3B is a chart of phase vs. the frequency characteristic of the piezoelectric vibrator when the cavity is filled with the sodium chloride solution.

FIGS. 3A and 3B are charts showing the frequency characteristics when the cavity 15 of the cavity resonator 11 shown in FIG. 1 is filled with a sodium chloride solution. Also in FIGS. 3A and 3B, as is the case with FIGS. 2A and 2B, the horizontal axes represent frequency (Hz), and the vertical axes represent impedance (A) and phase (B). As can be seen from a comparison with FIGS. 2A and 2B, many small resonant points appear in a frequency region D. These resonant points are resonant points of cavity resonances due to the fact that the cavity 15 is filled with the sodium chloride solution.

FIGS. 4A and 4B are enlarged charts of the frequency region D shown in FIGS. 3A and 3B. Here, however, not a logarithmic scale but a linear scale is used for the horizontal axes (frequency axes). As shown in FIGS. 4A and 4B, multiple resonant points of the cavity resonance appear in the frequency region D. These multiple resonant points are arranged at substantially regular intervals on the linear scale. In a section closer to the high frequency than this frequency region D, however, the resonant points overlap with the resonant point of the piezoelectric vibrator 11 itself (see FIGS. 2A and 2B) and become complicated, and therefore the intervallic regularity is lost.

Figure 5:
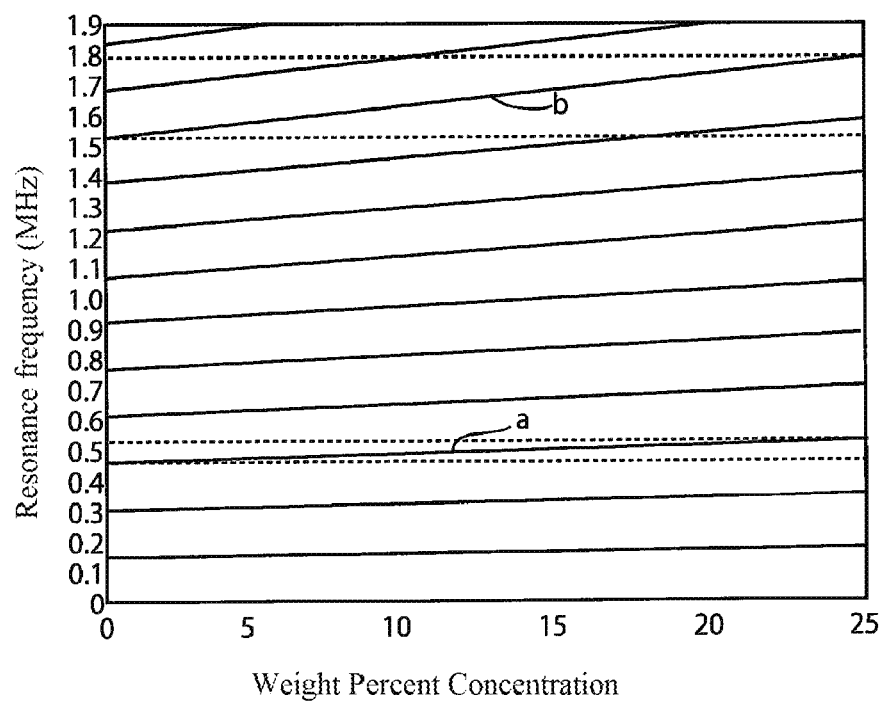
FIG. 5 is a chart of a relationship between a concentration of the sodium chloride solution and the respective resonant frequencies of multiple resonant modes in the frequency region.

FIG. 5 is a chart showing a relationship between the concentration of the sodium chloride solution and the respective resonant frequencies of multiple resonant modes in the frequency region D. The horizontal axis represents sodium chloride concentration calculated in weight percent, and the vertical axis represents frequency (MHz). FIG. 5 shows data when the temperature of the aqueous sodium chloride solution is 26° C. and the sodium chloride concentration ranges from 0% (fresh water) to 24.4% (saturated sodium chloride solution). It should be noted that dashed lines in FIG. 5 are lines for reference drawn parallel with the horizontal axis.

For example, in the case of a resonant mode having a low resonant frequency indicated by a graph "a" in FIG. 5, a variation in the resonant frequency with respect to a variation in the sodium chloride concentration is small. This means that the measurement accuracy of the concentration is low. In the case of the resonant mode having a low resonant frequency, however, even when the concentration is unknown, if the resonant frequency is detected, which resonant mode the resonant frequency belongs to is uniquely determined.

On the other hand, for example, in the case of a resonant mode having a high resonant frequency indicated by a graph b in FIG. 5, a variation in the resonant frequency with respect to a variation in the concentration is great. This means that the measurement accuracy of the concentration is high. In the case of a high resonant frequency, however, when the concentration is ignored, a plurality of resonant modes having the same resonant frequency are present. Therefore, even when the resonant frequency is detected, if the concentration is unknown, then the resonant mode cannot uniquely be determined. In order to determine the resonant mode uniquely, for example, the respective resonant frequencies of adjacent two resonant modes are detected, and a difference between these two resonant frequencies is calculated. As can be seen from FIG. 5, the resonant frequencies of adjacent two resonant modes become wider as the concentration of a solute (sodium chloride) increases. Therefore, from a value of the difference between the two resonant frequencies, the concentration of the solute is found out. If the concentration of the solute is found out, the resonant mode can be uniquely determined by detecting the resonant frequency.

Figure 6:
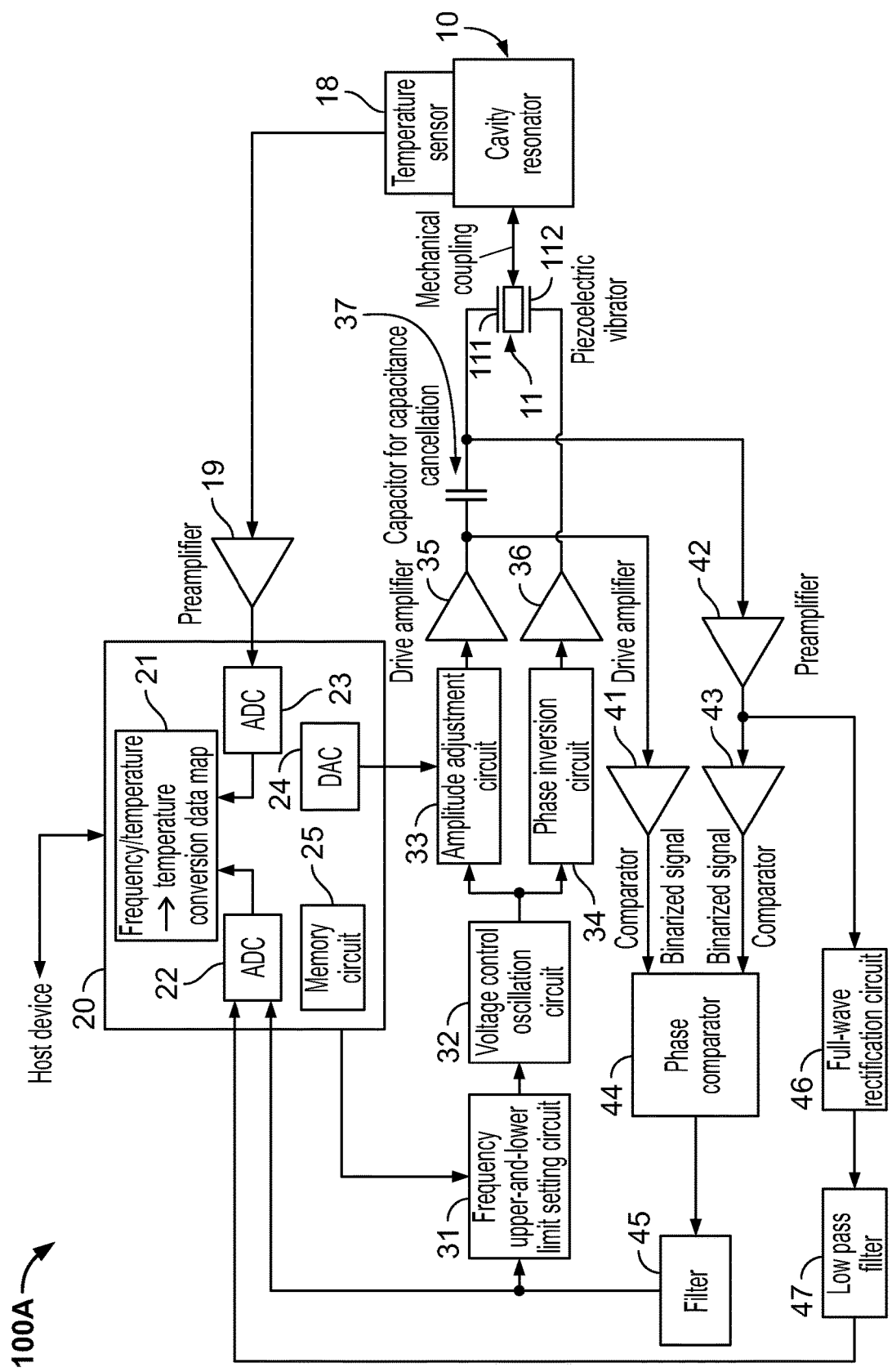
FIG. 6 is a block diagram of a concentration measuring instrument according to an embodiment.

A concentration measuring instrument 100A according to an embodiment, as shown in FIG. 6, includes a microcomputer 20 for performing communication with a host device (not shown). This microcomputer 20 is provided with general components as a microcomputer. Herein, a functional part as this concentration detection instrument 100A in this microcomputer 20 is described. This microcomputer 20 is provided with a conversion data map 21 for knowing the concentration of the solute from the resonant frequency detected in a manner described below and the temperature of the solution.

The microcomputer 20, as shown in FIG. 6, has a pair of A/D converters 22, 23 and a D/A converter 24. An output of a filter 45 for PLL circuit stabilization described later and an output of a low pass filter 47 are inputted into the A/D converter 22, and thus taken into the microcomputer 20. In addition, a temperature detection signal from a temperature sensor 18 for measuring the temperature of the solution in the cavity resonator 10 is inputted into the A/D converter 23 via a preamplifier 19, and thus taken into the microcomputer 20. In addition, a control signal for instructing an amplitude adjustment circuit 33 to perform amplitude adjustment is outputted from the D/A converter 24.

The microcomputer 20 has a memory circuit 25, as shown in FIG. 6. This memory circuit 25 stores, as an example, information for detecting the respective resonant frequencies of the two resonant modes indicated by the graphs "a", b in FIG. 5. Specifically, this memory circuit 25 stores information about which frequency range the resonant frequency in the resonant mode indicated by the graph "a" is in. In addition, this memory circuit 25 stores information about which frequency range the resonant frequency in the resonant mode of the graph b with respect to the resonant frequency in the resonant mode indicated by the graph "a" is in when the resonance frequency in the resonance mode indicated by the graph "a" is detected. When the resonant frequency in the resonant mode indicated by the graph "a" is detected, the concentration of the solute is found out from the resonant frequency detected. Therefore, the memory circuit 25 stores information about which frequency range the resonant frequency of the resonant mode of the graph b with respect to the concentration is in.

The concentration measuring instrument 100A, as shown in FIG. 6, has a drive circuit including a frequency upper-and-lower limit setting circuit 31, a voltage control oscillation circuit 32, an amplitude adjustment circuit 33, a phase inversion circuit 34, a pair of drive amplifiers 35, 36, and a capacitor for capacitance cancellation 37. The drive circuit generates a drive signal driving the piezoelectric vibrator 11 to transmit the ultrasonic wave.

Frequency upper and lower limit values are set in the frequency upper-and-lower limit setting circuit 31. A phase comparison result from a phase comparator 44 described later is inputted into this frequency upper-and-lower limit setting circuit 31 via the filter 45. Then, from this frequency upper-and-lower limit setting circuit 31, a voltage signal of a voltage value corresponding to a frequency between the upper and lower limit values set is outputted. It should be noted that in this frequency upper-and-lower limit setting circuit 31, the same frequency can be set as the upper limit and lower limit values of the frequency. In that case, from this frequency upper-and-lower limit setting circuit 31, a voltage value corresponding to one frequency set as the upper and lower limit values is outputted.

In addition, the voltage control oscillation circuit 32 is a circuit for outputting an oscillation signal of the frequency corresponding to the voltage value of the voltage signal outputted from the frequency upper-and-lower limit setting circuit 31. The oscillation signal outputted from this voltage control oscillation circuit 32 is inputted into both the amplitude adjustment circuit 33 and the phase inversion circuit 34. The amplitude adjustment circuit 33 is a circuit for adjusting the amplitude of the inputted oscillation signal according to the control signal outputted from the microcomputer 20. The meaning of this amplitude adjustment is described later. In addition, the phase inversion circuit 34 is a circuit for inverting the phase of the oscillation signal inputted.

One end of the capacitor for capacitance cancellation 37 is connected to a first electrode 111 of the piezoelectric vibrator 11. Then the oscillation signal having the amplitude adjusted at the amplitude adjustment circuit 33 passes through the drive amplifier 35 to drive as a first drive signal the first electrode 111 of the piezoelectric vibrator 11 via the capacitor for capacitance cancellation 37. In addition, the oscillation signal having the phase inverted at the phase inversion circuit 34 passes through the drive amplifier 36 to drive as a second drive signal a second electrode 112 of the piezoelectric vibrator 11.

In FIG. 6, the piezoelectric vibrator 11 is depicted at a position remote from the cavity resonator 10 for the convenience of illustration. This piezoelectric vibrator 11, however, is so positioned as to face the cavity 15 filled with the solution, as described above with reference to FIG. 1. The drive signals drive the piezoelectric vibrator 11 to transmit the ultrasonic wave into the cavity 15 as described above.

Now, the description of the concentration measuring instrument 100A of FIG. 6 is suspended, and the principle of parallel capacitance component cancellation of the piezoelectric vibrator 11 in the concentration measuring instrument 100A is described.

Figure 4:
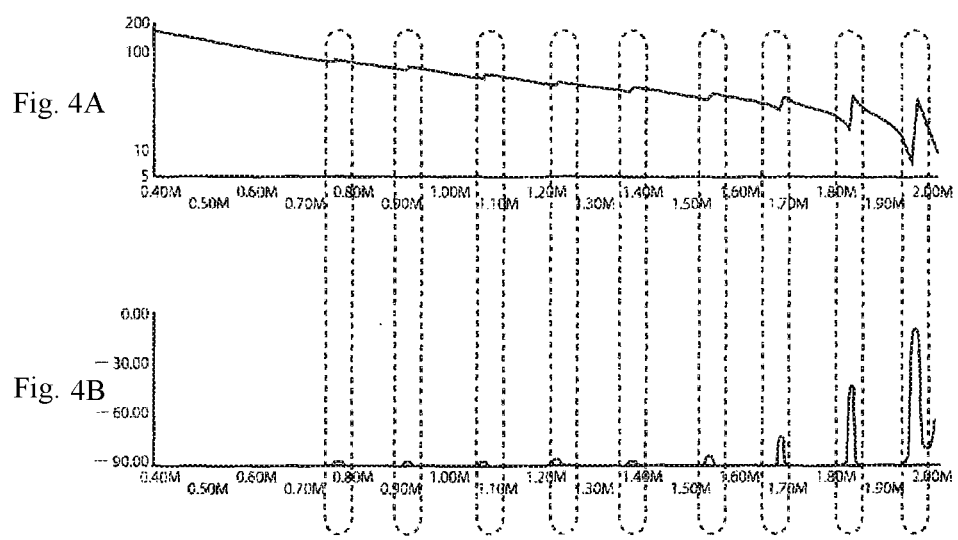
FIG. 4A is a chart of an enlarged portion of a frequency region of FIG. 3A.
FIG. 4B is a chart of an enlarged portion of the frequency region of FIG. 3B.
Figure 7:
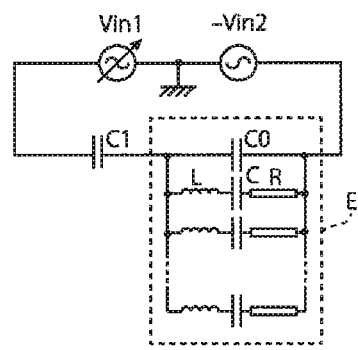
FIG. 7 is a circuit diagram of a principle of parallel capacitance component cancellation of the piezoelectric vibrator.

FIG. 7 is a diagram illustrating the principle of parallel capacitance component cancellation of the piezoelectric vibrator 11. The piezoelectric vibrator 11 can be represented as a series-parallel resonant circuit E shown in FIG. 7. Each of the multiple cavity resonances arranged at regular intervals, as shown in FIG. 4, is represented as a series resonance of a coil L, a capacitance C, and a resistance R. In order to detect a variation by one resonant mode of this cavity resonance, it is necessary to cancel a parallel capacitance component C0 in this series-parallel resonant circuit E with a high degree of accuracy.

In principle, as shown in FIG. 7, a capacitor C1 having the same capacitance as the parallel capacitance component C0 of the piezoelectric vibrator 11 is connected, and driven by two signal sources Vin1, −Vin2 having mutually inverted phases but having the same amplitude, and then the parallel capacitance component C0 is cancelled, and a signal component of the series resonance can be taken out. However, it is difficult to prepare as the capacitor C1 a capacitor having the same capacitance as the parallel capacitance component C0, and consequently the capacitor C1 having an approximate capacitance is prepared. In this case, the parallel capacitance component C0 of the piezoelectric vibrator 11 can be cancelled by adjusting the amplitude of one signal source to offset the difference in capacitance.

In the concentration measuring instrument 100A shown in FIG. 6, on the basis of the principle described with reference to FIG. 7, a signal equivalent to Vin1 in FIG. 7 is generated at the amplitude adjustment circuit 33, and a signal equivalent to −Vin2 in FIG. 7 is also generated at the phase inversion circuit 34. The capacitor for capacitance cancellation 37 is equivalent to the capacitor C1 in FIG. 7. The capacitor for capacitance cancellation 37 is a capacitor having a capacitance approximate to the parallel capacitance component (parallel capacitance component C0 in FIG. 7) of the piezoelectric vibrator 11. However, since the capacitance of the capacitor for capacitance cancellation 37 is not the same capacitance as the parallel capacitance component, the amplitude is adjusted by the amplitude adjustment circuit 33 in order to cancel an error due to the difference in capacitance. An amplitude adjustment method using this amplitude adjustment circuit 33 is described later.

A first drive signal outputted from the drive amplifier 35 is inputted into a comparator 41, shown in FIG. 6, to be converted into a binarized signal, and inputted into the phase comparator 44. In addition, a detection signal at the first electrode 111 of the piezoelectric vibrator 11 is amplified at the preamplifier 42, inputted into a comparator 43 to be converted into a binarized signal, and inputted into the phase comparator 44.

Figure 8:
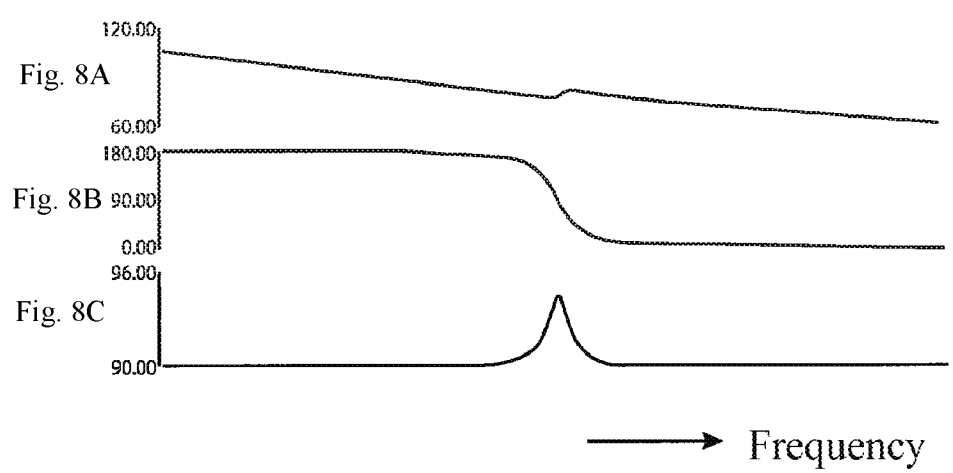
FIG. 8A is a chart of impedance vs. frequency at a cavity resonant point.
FIG. 8B is a chart of phase of a detection signal vs. frequency at the cavity resonant point.
FIG. 8C is a chart of a phase of a waveform of a current vs. frequency at the cavity resonant point.

FIGS. 8A-8C are charts showing variations in impedance and phase at one cavity resonant point. It should be noted that this cavity resonant point shown in FIGS. 8A-8C is a resonant point around 0.9 MHz in FIG. 4.

FIG. 8A represents an impedance, at the cavity resonant point, obtained by dividing a voltage between the first electrode 111 and the second electrode 112 of the piezoelectric vibrator 11 by a current flowing therein, as is the case with FIG. 4(A).

FIG. 8C represents, when a voltage waveform between the first electrode 111 and the second electrode 112 of the piezoelectric vibrator 11 is set as a reference, a phase of a waveform of a current flowing therein at the cavity resonant point, as is the case with FIG. 4B.

FIG. 8B represents a phase of the detection signal at the first electrode 111 of the piezoelectric vibrator 11 when the first drive signal outputted from the drive amplifier 35 shown in FIG. 6C is set as a reference. The phase of this detection signal varies greatly from 180° to 0° at this resonant point.

The phase comparator 44, shown in FIG. 6, functions to capture such a variation in phase as shown in FIG. 8B at the resonant point. The phase comparator 44 performs a phase comparison between the drive signal and the detection signal obtained by detecting the ultrasonic wave reflected at the piezoelectric vibrator 11. An output of this phase comparator 44 is inputted into the frequency upper-and-lower limit setting circuit 31 and the microcomputer 20 via the filter 45.

Even in one resonant mode, the resonant frequency varies as the concentration and/or temperature of the solution varies. As the resonant frequency varies, input and output voltage values of the frequency upper-and-lower limit setting circuit 31 vary following the variation in the resonant frequency, and thereby the frequency of the oscillation signal generated at the voltage control oscillation circuit 32 varies. In this manner, in the concentration measuring instrument 100A shown in FIG. 6, a PLL (Phase Locked Loop) circuit is configured.

As shown in FIG. 6, an output of the preamplifier 42 is inputted into a full-wave rectification circuit 46 to undergo full-wave rectification, and inputted into the microcomputer 20 via a low pass filter 47. The concentration measuring instrument 100A shown in FIG. 6 is provided with a circuit configuration described above.

Next, the operation of the concentration measuring instrument 100A in FIG. 6 is described.

Initial adjustment is first performed when the cavity 15 (see FIG. 1) of the cavity resonator 10 is empty (air), such as before shipment of this concentration measuring instrument 100A or during maintenance thereof. The initial adjustment is performed using a frequency around a frequency intended to be used during an actual operation. Then, the amplitude adjustment of the oscillation signal by the amplitude adjustment circuit 33 is performed such that a signal inputted into the microcomputer 20 from the low pass filter 47 infinitely approaches zero.

By this amplitude adjustment, even when the capacitance of the capacitor for capacitance cancellation 37 is slightly different from the parallel capacitance component of the piezoelectric vibrator 11, the parallel capacitance component of the piezoelectric vibrator 11 is cancelled with a high degree of accuracy. When this initial adjustment is completed, the amplitude adjustment by the amplitude adjustment circuit 33 in an operation after the initial adjustment is maintained in the same conditions as the amplitude adjustment at the time of the initial adjustment.

In actual operation, after the cavity 15 of the cavity resonator 10 is filled with the solution, when the concentration measuring instrument 100A in FIG. 6 is powered on, a frequency for searching the resonant frequency of the resonant mode of the graph "a" shown in FIG. 5 is set at the frequency upper-and-lower limit setting circuit 31. In this context, the same one frequency is set as the upper and lower limit values of the frequency. Then, an output signal from the phase comparator 44 at that time is monitored by the microcomputer 20 via the filter 45. This operation is repeated while the frequency set at the frequency upper-and-lower limit setting circuit 31 is being varied gradually within a frequency band around the resonant frequency of the resonant mode of the graph "a" stored in the memory circuit 25. Thereupon, a current resonant frequency in the resonant mode of the graph "a" is detected. Then, from this resonant frequency detected, the concentration of the solution is determined. As described above, however, in the graph "a", the variation width of the frequency with respect to the concentration variation is small, so that the accurate concentration is still unknown.

With the provisional concentration determined, next, frequency upper limit-and-lower limit values including the resonant frequency of the resonant mode of the graph b at the provisional concentration are set at the frequency upper-and-lower limit setting circuit 31. Then, the frequency upper-and-lower limit setting circuit 31 is in turn operated as the PLL circuit to capture the resonant frequency of the resonant mode of the graph b. This PLL circuit continues capturing the resonant frequency of the resonant mode of the graph b, following the resonant frequency varying with the variation in concentration or temperature. The microcomputer 20 constantly monitors the output from the filter 45 to detect the current resonant frequency of the resonant mode of the graph b. In the microcomputer 20, the concentration of the solution is found from the resonant frequency detected and the temperature of the solution by referring to the conversion data map 21, and transmitted to the host device.

In the concentration measuring instrument 100A shown in FIG. 6, the concentration of the solution is thus constantly monitored.

Hereinabove, an example of detecting the resonant frequency of the resonant mode indicated by the graph "a" first, before the PLL circuit is made to follow the resonant frequency of the resonant mode of the graph b shown in FIG. 5, has been described. The resonant frequency of the resonant mode indicated by the graph "a" does not overlap with the resonant frequency of an adjacent resonant mode. Therefore, once the resonant frequency is detected, it is found that the resonant frequency detected is the resonant frequency of the resonant mode of the resonant mode of the graph "a". On the other hand, the resonant mode indicated by the graph b in FIG. 5 is a resonant mode that may have the same resonant frequency as an adjacent resonant mode when the concentration is ignored. The concentration can also be found by using such a resonant mode that may have the same resonant frequency as an adjacent resonant mode.

By using the same technique as the above detection of the resonant frequency of the resonant mode of the graph "a", the resonant frequency of a resonant mode (that may be a resonant mode adjacent to the resonant mode of the graph b, depending on the concentration) aiming at the resonant mode of the graph b, for example, is detected. Then, furthermore, the resonant frequency of a resonant mode adjacent to that resonant mode is detected. Then, a difference between these two resonant frequencies is calculated. As described above, the value of this difference become greater as the concentration increases, so that the concentration is found out from the value of this difference. If the concentration is found out, which resonant mode each of the two resonant frequencies detected belongs to is also found out. In this manner, the frequency upper and lower limit values to be set at the frequency upper-and-lower limit setting circuit 31 for following the resonant frequency of the resonant mode of the graph b is found. Thereafter, the frequency upper-and-lower limit setting circuit 31 is operated as the PLL circuit in the same manner as described above to follow the resonant frequency of the resonant mode of the graph b, and can constantly monitor the concentration of the solution.

Figure 9:
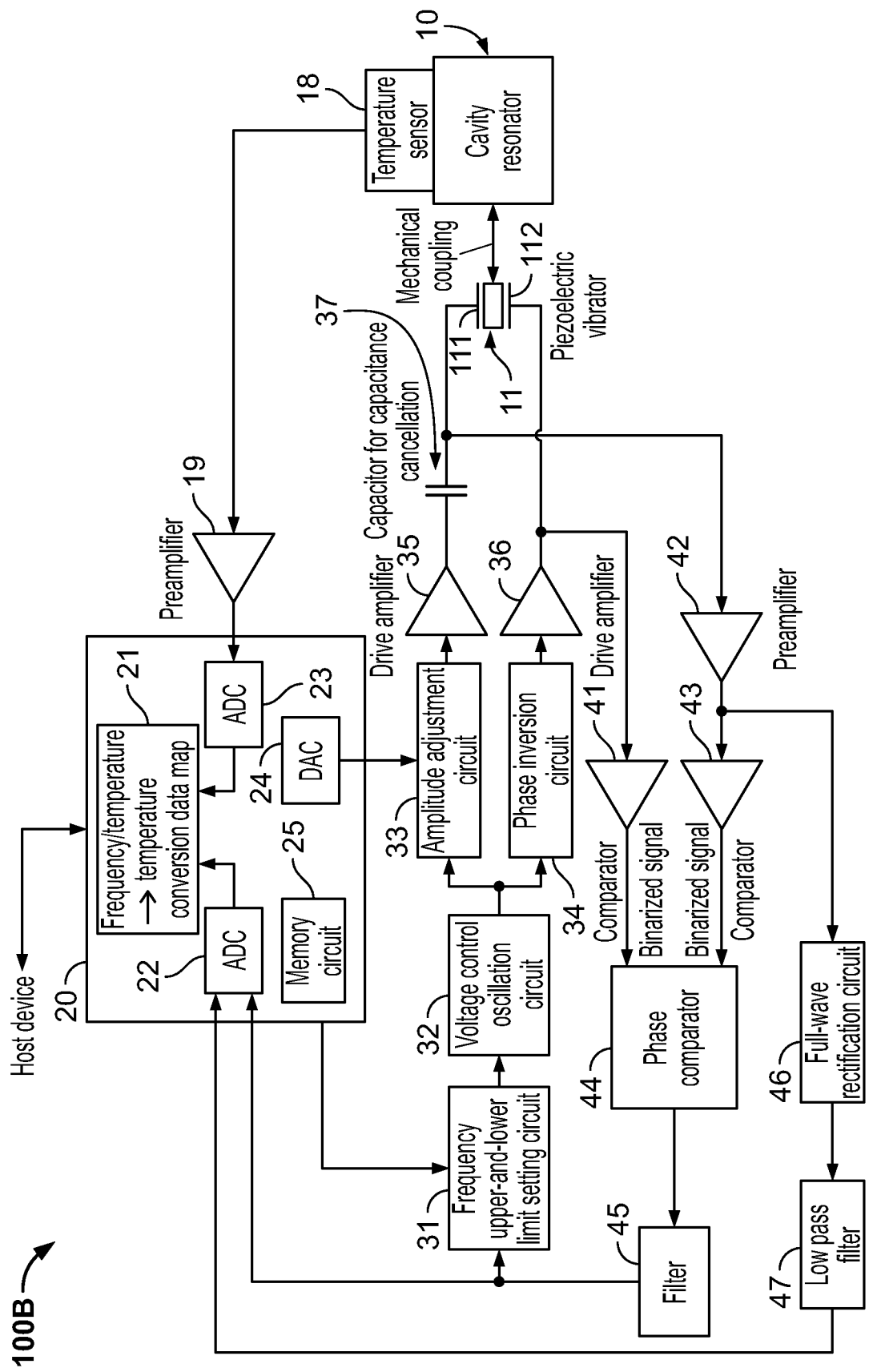
FIG. 9 is a block diagram of a concentration measuring instrument according to another embodiment.

FIG. 9 is a circuit block diagram of a concentration measuring instrument 100B according to another embodiment. A difference from the concentration measuring instrument 100A as the first example shown in FIG. 6 is primarily described.

In the case of the concentration measuring instrument 100A shown in FIG. 6, the first drive signal outputted from the drive amplifier 35 is inputted into the comparator 41. In contrast, in the case of the concentration measuring instrument 100B shown in FIG. 9, the second drive signal outputted from the drive amplifier 36 is inputted into the comparator 41. The first drive signal and the second drive signal outputted from the two drive amplifiers 35, 36 are drive signals having mutually inverted phases. The concentration measuring instrument 100B in FIG. 9 has an inverted phase relationship between the two binarized signals inputted into the phase comparator 44, as compared with the concentration measuring instrument 100A in FIG. 6. The concentration measuring instrument 100B in FIG. 9, however, also operates in exactly the same manner as the concentration measuring instrument 100A shown in FIG. 6.

Figure 10:
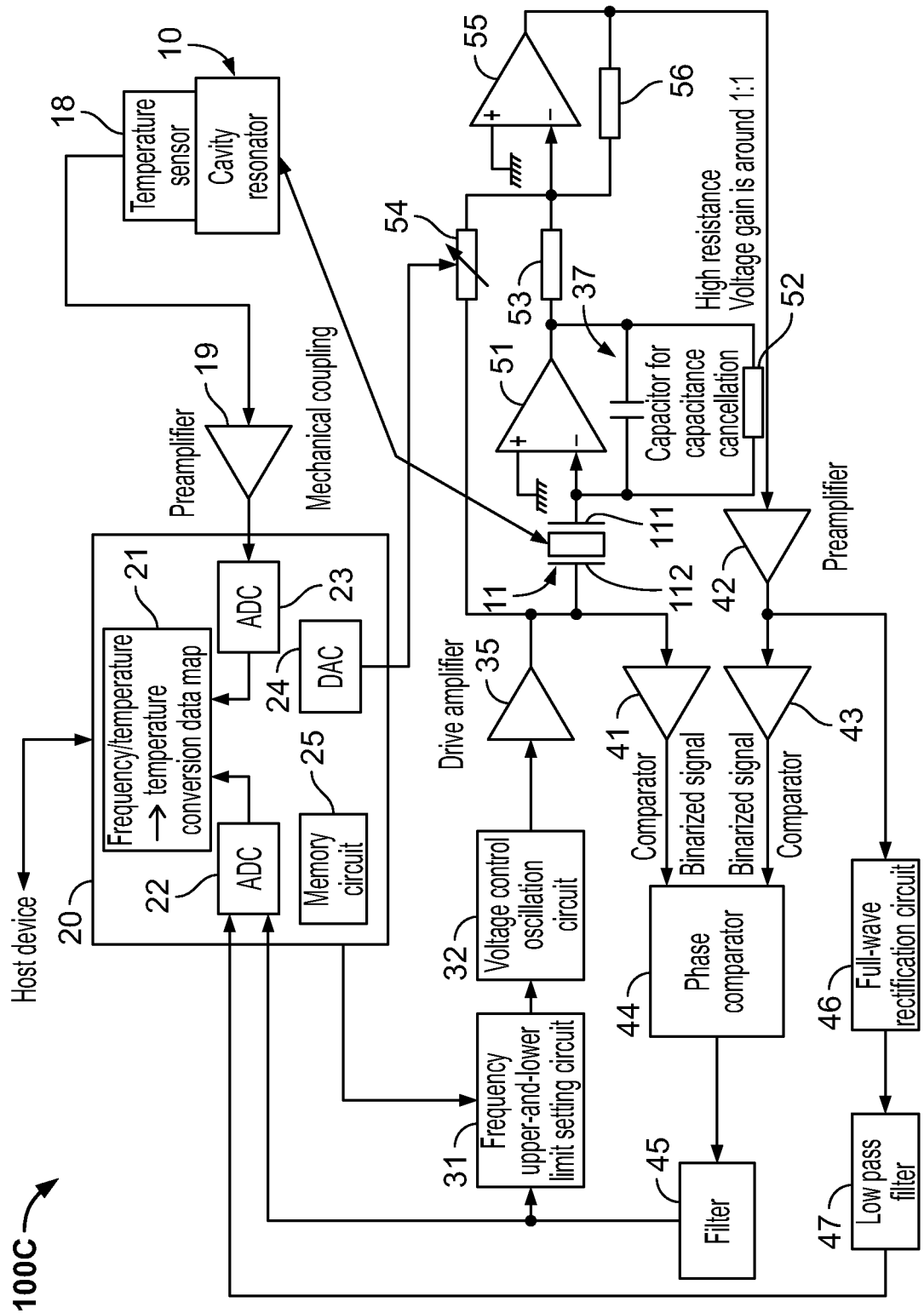
FIG. 10 is a block diagram of a concentration measuring instrument according to another embodiment.

FIG. 10 is a circuit block diagram of a concentration measuring instrument 100C according to a third embodiment. As is the case with the second embodiment shown in FIG. 9, a difference from the concentration measuring instrument 100A of the first embodiment shown in FIG. 6 is primarily described.

In the case of the concentration measuring instrument 100C shown in FIG. 10, the first electrode 111 of the piezoelectric vibrator 11 is connected to a minus input terminal of an operational amplifier 51. Moreover, the capacitor for capacitance cancellation 37 is connected between the minus input terminal and an output terminal of the operational amplifier 51. A resistor 52 having high resistance is also connected between the minus input terminal and the output terminal. A plus input terminal of this operational amplifier 51 is grounded.

In the embodiment shown in FIG. 10, the oscillation signal outputted from the voltage control oscillation circuit 32 is directly inputted into the drive amplifier 35, and outputted as a drive signal from that drive amplifier 35. This drive signal is inputted into the second electrode 112 of the piezoelectric vibrator 11, and the piezoelectric vibrator 11 is driven by this drive signal. In addition, the drive signal outputted from the drive amplifier 35 is also inputted into the comparator 41.

The output terminal of the operational amplifier 51 is connected to a minus input terminal of another operational amplifier 55 via the resistor 53, as shown in FIG. 10. In addition, an attenuator 54 is also connected to this minus input terminal. In this attenuator 54, a gain of the drive signal outputted from the drive amplifier 35 is attenuated to approximately a half. A gain of this attenuation is controlled by the microcomputer 20. A plus input terminal of this operational amplifier 55 is grounded. In addition, a resistor 56 is connected between the minus input terminal and the output terminal of this operational amplifier 55.

The minus input terminal of the operational amplifier 51 connected with the piezoelectric vibrator 11 is connected to the first terminal 111 of the piezoelectric vibrator 11 connected with the capacitor for capacitance cancellation 37. Therefore, in the other operational amplifier 55, an inverted signal of the signal before parallel capacitance component cancellation detected at the piezoelectric vibrator 11 and the drive signal attenuated to approximately a half at the attenuator 54 are added and further inverted. That is, a detection signal obtained by subtracting approximately a half of the drive signal from the signal before parallel capacitance component cancellation detected at the piezoelectric vibrator 11 is outputted from the operational amplifier 55. This detection signal outputted from the operational amplifier 55 is inputted into the comparator 43 via the preamplifier 42.

Figure 11A:
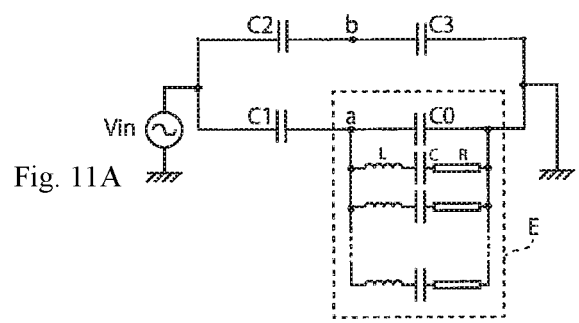
FIG. 11A is a circuit diagram of the principle of parallel capacitance component cancellation of the piezoelectric vibrator in the concentration measuring instrument shown in FIG. 10.
Figure 11B:
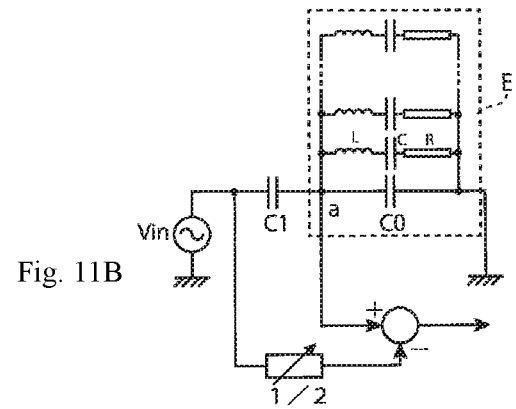
FIG. 11B is another circuit diagram of the principle of parallel capacitance component cancellation of the piezoelectric vibrator in the concentration measuring instrument shown in FIG. 10.

FIGS. 11A and 11B show the principle of parallel capacitance component cancellation of the piezoelectric vibrator 11 in the concentration measuring instrument shown in FIG. 10.

As is the case with FIG. 7, also in FIGS. 11A and 11B, the piezoelectric vibrator 11 is represented as the series-parallel resonant circuit E. Each of the multiple cavity resonances arranged at regular intervals shown in FIG. 4 is represented as a series resonance of the coil L, the capacitance C and the resistance R. In order to detect a variation by one resonant mode of this cavity resonance, it is necessary to cancel the parallel capacitance component C0 in this series-parallel resonant circuit E with a high degree of accuracy.

As shown in FIG. 11A, the parallel capacitance component C0 of the piezoelectric vibrator 11 is intended to be cancelled by a bridge circuit. In the bridge circuit shown in FIG. 11A, if the parallel capacitance component C0 of the piezoelectric vibrator 11 and the respective capacitances C1, C2, C3 of three capacitors C1, C2, C3 satisfy C0=C1=C2=C3, the parallel capacitance component C0 of the piezoelectric vibrator 11 is cancelled by subtracting a signal at a point b from a signal at a point a, so that only the serial resonance can be observed.

In this context, because C2=C3, the signal at the point b is constantly a half of a signal Vin of a drive source. Therefore, it is only necessary to remove the capacitors C2, C3 and, as shown in FIG. 11B, attenuate the signal Vin of the drive source to a half and subtract the same from the signal at the point a. However, it is difficult to prepare as the capacitor C1 a capacitor having the same capacitance as the parallel capacitance component C0 of the piezoelectric vibrator 11, and consequently the capacitor C1 having an approximate capacitance is prepared. In this case, the parallel capacitance component C0 of the piezoelectric vibrator 11 can be cancelled by slightly adjusting an attenuation rate of the signal Vin of the drive source from one-half to offset the difference in capacitance.

In the concentration measuring instrument 100C shown in FIG. 10, this principle is used to cancel the parallel capacitance component of the piezoelectric vibrator 11 with a high degree of accuracy.

In the concentration measuring instrument 100C shown in FIG. 10, first, when the cavity 15 (see FIG. 1) of the cavity resonator 10 is empty (air), initial adjustment is performed. This initial adjustment is performed when the cavity 15 (see FIG. 1) of the cavity resonator 10 is empty (air), such as before shipment of this concentration measuring instrument 100A or during maintenance thereof.

The initial adjustment is performed using a frequency around a frequency intended to be used at the time of an actual operation. Then, attenuation gain adjustment of the drive signal by the attenuator 54 is performed such that the signal inputted into the microcomputer 20 from the low pass filter 47 infinitely approaches zero. By this gain adjustment, the parallel capacitance component of the piezoelectric vibrator 11 is cancelled with a high degree of accuracy even when the capacitance of the capacitor for capacitance cancellation 37 is slightly different from the parallel capacitance component of the piezoelectric vibrator 11. Once this initial adjustment is completed, the attenuation gain adjustment of the drive signal by the attenuator 54 in an operation after the initial adjustment is maintained in the same conditions as the attenuation gain adjustment at the time of this initial adjustment.

The operation after the initial adjustment of this concentration measuring instrument 100C shown in FIG. 10 is the same as that of the concentration measuring instrument 100A shown in FIG. 6, and therefore the duplicated description is omitted herein.

In this manner, according to each of the concentration measuring instruments 100A, 100B, 100C described above, the concentration of the solution is monitored with a high degree of accuracy and continuously by such a small circuit.

What is claimed is:

1. A concentration measuring instrument, comprising:
    a piezoelectric vibrator transmitting an ultrasonic wave into a solution contained in a cavity and detecting the ultrasonic wave reflected;
    a temperature sensor measuring a temperature of the solution in the cavity;
    a drive circuit generating a drive signal driving the piezoelectric vibrator to transmit the ultrasonic wave, the drive circuit includes a capacitor connected to the piezoelectric vibrator;
    a phase comparator performing a phase comparison between the drive signal and a detection signal obtained by detecting the ultrasonic wave reflected at the piezoelectric vibrator;
    a frequency setting circuit operatively connected to an output of the phase comparator, and making the drive circuit generate drive signals having sequentially different frequencies and monitoring a phase comparison result from the phase comparator while the piezoelectric vibrator is driven by the drive signal to detect a resonant frequency of a resonant mode to be measured;
    a Phase Locked Loop (PLL) circuit including the drive circuit and the phase comparator, the PLL circuit making a frequency of the drive signal follow the resonant frequency detected at the frequency setting circuit; and
    a microcomputer determining a concentration of a solute in the solution on a basis of the frequency of the drive signal while the PLL circuit is being operated and a result of temperature measurement by the temperature sensor.

2. The concentration measuring instrument of claim 1, wherein the frequency setting circuit detects the resonant frequency of the resonant mode to be measured by detecting a resonant frequency of a first resonant mode.

3. The concentration measuring instrument of claim 1, wherein the frequency setting circuit detects a resonant frequency of a second resonant mode and a resonant frequency of a third resonant mode different from the second resonant mode to detect the resonant frequency of the resonant mode to be measured on a basis of at least one of the resonant frequency of the second resonant mode and the resonant frequency of the third resonant mode and a difference frequency between the resonant frequency of the second resonant mode and the resonant frequency of the third resonant mode.

4. The concentration measuring instrument of claim 1, wherein the capacitor cancels a parallel capacitance component of the piezoelectric vibrator.

5. The concentration measuring instrument of claim 1, wherein the capacitor is connected to a first electrode of the piezoelectric vibrator for generating a first drive signal and a second drive signal constituting the drive signal and having mutually inverted phases.

6. The concentration measuring instrument of claim 5, wherein the first electrode is driven by the first drive signal via the capacitor and a second electrode of the piezoelectric vibrator is driven by the second drive signal.

7. The concentration measuring instrument of claim 6, wherein the drive circuit includes an amplitude adjustment circuit adjusting an amplitude of the first drive signal or the second drive signal.

8. The concentration measuring instrument of claim 1, wherein the capacitor is connected to a first electrode of the piezoelectric vibrator, and the drive circuit includes an attenuator attenuating the drive signal, and computes a difference between a signal of the first electrode and the drive signal after attenuation by the attenuator.

9. The concentration measuring instrument of claim 8, wherein the drive circuit adjusts an attenuation gain of the drive signal from the attenuator.

10. The concentration measuring instrument of claim 1, wherein the drive circuit includes a phase inversion circuit inverting a phase of an oscillation signal, an amplitude adjustment circuit adjusting an amplitude of the oscillation signal, the capacitor connected to a first electrode of the piezoelectric vibrator, a first drive amplifier receiving the oscillation signal after amplitude adjustment outputted from the amplitude adjustment circuit and driving the piezoelectric vibrator via the capacitor, and a second drive amplifier connected to a second electrode of the piezoelectric vibrator and driving the piezoelectric vibrator by the oscillation signal having the phase inverted by the phase inversion circuit.

11. The concentration measuring instrument of claim 10, further comprising monitoring a detection signal of the first electrode of the piezoelectric vibrator according to an instruction when the cavity is empty and controlling the amplitude adjustment circuit such that the detection signal is minimized.

12. The concentration measuring instrument of claim 1, wherein the drive circuit includes a drive amplifier receiving an oscillation signal, connected to a first electrode of the piezoelectric vibrator, and driving the piezoelectric vibrator, a phase inversion circuit connected to a second electrode of the piezoelectric vibrator and having the capacitor arranged in a feedback loop for inverting a phase of a detection signal detected at the second electrode and outputting the detection signal having the phase inverted, an attenuator adjusting a gain of a drive signal output from the drive amplifier, and an adding circuit adding the detection signal having the phase inverted and outputted and the drive signal having the gain adjusted.

13. The concentration measuring instrument of claim 12, wherein the drive circuit monitors an output signal of the adding circuit according to an instruction when the cavity is empty and controls an amplitude adjustment circuit such that the detection signal is minimized.

14. The concentration measuring instrument of claim 1, wherein the frequency setting circuit outputs a voltage signal corresponding to a frequency between an upper and a lower frequency limit.

15. The concentration measuring instrument of claim 14, wherein an output of the microcomputer is operatively connected to the frequency setting circuit for setting the upper and lower frequency limits.

16. The concentration measuring instrument of claim 1, further comprising a voltage control oscillation circuit having:

an input connected to an output of the frequency setting circuit; and
an output connected to the drive circuit.

17. The concentration measuring instrument of claim 1, further comprising a filter arranged between the phase comparator and the frequency setting circuit.

18. A concentration measuring instrument, comprising:
a piezoelectric vibrator transmitting an ultrasonic wave into a solution contained in a cavity and detecting the ultrasonic wave reflected;
a temperature sensor measuring a temperature of the solution in the cavity;
a drive circuit generating a drive signal driving the piezoelectric vibrator to transmit the ultrasonic wave, the drive circuit including a capacitor cancelling a parallel capacitance component of the piezoelectric vibrator;
a phase comparator performing a phase comparison between the drive signal and a detection signal obtained by detecting the ultrasonic wave reflected at the piezoelectric vibrator;
a frequency setting circuit making the drive circuit generate drive signals having sequentially different frequencies and monitoring a phase comparison result from the phase comparator while the piezoelectric vibrator is driven by the drive signal to detect a resonant frequency of a resonant mode to be measured;
a Phase Locked Loop (PLL) circuit including the drive circuit and the phase comparator, the PLL circuit making a frequency of the drive signal follow the resonant frequency detected at the frequency setting circuit; and
a microcomputer determining a concentration of a solute in the solution on a basis of the frequency of the drive signal while the PLL circuit is being operated and a result of temperature measurement by the temperature sensor.

19. A concentration measuring instrument, comprising:
a piezoelectric vibrator transmitting an ultrasonic wave into a solution contained in a cavity and detecting the ultrasonic wave reflected;
a temperature sensor measuring a temperature of the solution in the cavity;
a drive circuit generating a drive signal driving the piezoelectric vibrator to transmit the ultrasonic wave, the drive circuit including a phase inversion circuit inverting a phase of an oscillation signal, and an amplitude adjustment circuit adjusting an amplitude of the oscillation signal;
a phase comparator performing a phase comparison between the drive signal and a detection signal obtained by detecting the ultrasonic wave reflected at the piezoelectric vibrator;
a frequency setting circuit making the drive circuit generate drive signals having sequentially different frequencies and monitoring a phase comparison result from the phase comparator while the piezoelectric vibrator is driven by the drive signal to detect a resonant frequency of a resonant mode to be measured;
a Phase Locked Loop (PLL) circuit including the drive circuit and the phase comparator, the PLL circuit making a frequency of the drive signal follow the resonant frequency detected at the frequency setting circuit; and
a microcomputer determining a concentration of a solute in the solution on a basis of the frequency of the drive signal while the PLL circuit is being operated and a result of temperature measurement by the temperature sensor.

20. The concentration measuring instrument of claim 19, wherein the drive circuit further includes a capacitor connected to a first electrode of the piezoelectric vibrator, a first drive amplifier receiving the oscillation signal after amplitude adjustment outputted from the amplitude adjustment circuit and driving the piezoelectric vibrator via the capacitor, and a second drive amplifier connected to a second electrode of the piezoelectric vibrator and driving the piezoelectric vibrator by the oscillation signal having the phase inverted by the phase inversion circuit.

21. A concentration measuring instrument, comprising:
a piezoelectric vibrator transmitting an ultrasonic wave into a solution contained in a cavity and detecting the ultrasonic wave reflected;
a temperature sensor measuring a temperature of the solution in the cavity;
a drive circuit generating a drive signal driving the piezoelectric vibrator to transmit the ultrasonic wave, the drive circuit includes a drive amplifier receiving an oscillation signal, connected to a first electrode of the piezoelectric vibrator, and driving the piezoelectric vibrator;
a phase comparator performing a phase comparison between the drive signal and a detection signal obtained by detecting the ultrasonic wave reflected at the piezoelectric vibrator;
a frequency setting circuit operatively connected to an output of the phase comparator, and making the drive circuit generate drive signals having sequentially different frequencies and monitoring a phase comparison result from the phase comparator while the piezoelectric vibrator is driven by the drive signal to detect a resonant frequency of a resonant mode to be measured;
a Phase Locked Loop (PLL) circuit including the drive circuit and the phase comparator, the PLL circuit making a frequency of the drive signal follow the resonant frequency detected at the frequency setting circuit; and
a microcomputer determining a concentration of a solute in the solution on a basis of the frequency of the drive signal while the PLL circuit is being operated and a result of temperature measurement by the temperature sensor.

22. The concentration measuring instrument of claim 21, wherein the drive circuit includes a phase inversion circuit connected to a second electrode of the piezoelectric vibrator and having a capacitor arranged in a feedback loop for inverting a phase of a detection signal detected at the second electrode and outputting the detection signal having the phase inverted, an attenuator adjusting a gain of a drive signal output from the drive amplifier, and an adding circuit adding the detection signal having the phase inverted and outputted and the drive signal having the gain adjusted.

23. The concentration measuring instrument of claim 22, wherein the drive circuit monitors an output signal of the adding circuit according to an instruction when the cavity is empty and controls an amplitude adjustment circuit such that the detection signal is minimized.

24. A concentration measuring instrument, comprising:
a piezoelectric vibrator transmitting an ultrasonic wave into a solution contained in a cavity and detecting the ultrasonic wave reflected;
a temperature sensor measuring a temperature of the solution in the cavity;
a drive circuit generating a drive signal driving the piezoelectric vibrator to transmit the ultrasonic wave;
a phase comparator performing a phase comparison between the drive signal and a detection signal obtained by detecting the ultrasonic wave reflected at the piezoelectric vibrator;
a frequency setting circuit operatively connected to an output of the phase comparator, and making the drive circuit generate drive signals having sequentially different frequencies and monitoring a phase comparison result from the phase comparator while the piezoelectric vibrator is driven by the drive signal to detect a resonant frequency of a resonant mode to be measured;
a voltage control oscillation circuit having an input connected to an output of the frequency setting circuit and an output connected to the drive circuit;
a Phase Locked Loop (PLL) circuit including the drive circuit and the phase comparator, the PLL circuit making a frequency of the drive signal follow the resonant frequency detected at the frequency setting circuit; and
a microcomputer determining a concentration of a solute in the solution on a basis of the frequency of the drive signal while the PLL circuit is being operated and a result of temperature measurement by the temperature sensor.

25. A concentration measuring instrument, comprising:
a piezoelectric vibrator transmitting an ultrasonic wave into a solution contained in a cavity and detecting the ultrasonic wave reflected;
a temperature sensor measuring a temperature of the solution in the cavity;
a drive circuit generating a drive signal driving the piezoelectric vibrator to transmit the ultrasonic wave;
a phase comparator performing a phase comparison between the drive signal and a detection signal obtained by detecting the ultrasonic wave reflected at the piezoelectric vibrator;
a frequency setting circuit operatively connected to an output of the phase comparator, and making the drive circuit generate drive signals having sequentially different frequencies and monitoring a phase comparison result from the phase comparator while the piezoelectric vibrator is driven by the drive signal to detect a resonant frequency of a resonant mode to be measured;
a filter arranged between the phase comparator and the frequency setting circuit;
a Phase Locked Loop (PLL) circuit including the drive circuit and the phase comparator, the PLL circuit making a frequency of the drive signal follow the resonant frequency detected at the frequency setting circuit; and
a microcomputer determining a concentration of a solute in the solution on a basis of the frequency of the drive signal while the PLL circuit is being operated and a result of temperature measurement by the temperature sensor.

* * * * *